US008652675B2

(12) United States Patent
Yun et al.

(10) Patent No.: US 8,652,675 B2
(45) Date of Patent: Feb. 18, 2014

(54) COOLING STRUCTURE OF LITHIUM ION SECONDARY BATTERY SYSTEM

(75) Inventors: Jung Sik Yun, Daejeon (KR); Jeon Keun Oh, Daejeon (KR); Yu Rim Do, Daejeon (KR)

(73) Assignee: SK Energy Co. Ltd., Seoul (KR)

( * ) Notice: Subject to any disclaimer, the term of this patent is extended or adjusted under 35 U.S.C. 154(b) by 585 days.

(21) Appl. No.: 12/159,533

(22) PCT Filed: Jan. 3, 2007

(86) PCT No.: PCT/KR2007/000030
§ 371 (c)(1),
(2), (4) Date: Jun. 27, 2008

(87) PCT Pub. No.: WO2007/078147
PCT Pub. Date: Jul. 12, 2007

(65) Prior Publication Data
US 2008/0299449 A1    Dec. 4, 2008

(30) Foreign Application Priority Data

Jan. 5, 2006   (KR) .................. 10-2006-0001357
Jan. 2, 2007   (KR) .................. 10-2007-0000208

(51) Int. Cl.
*H01M 2/02*    (2006.01)
*H01M 2/10*    (2006.01)
*H01M 10/50*   (2006.01)

(52) U.S. Cl.
USPC ............ 429/120; 429/148; 429/149; 429/156

(58) Field of Classification Search
USPC ................ 429/120, 148–149, 152–154, 163, 429/175–176
See application file for complete search history.

(56) References Cited

U.S. PATENT DOCUMENTS 4,002,493 A * 1/1977 Warszawski .................. 429/435
4,365,007 A * 12/1982 Maru et al. .................... 429/425
(Continued)

FOREIGN PATENT DOCUMENTS

JP   2005-294023   10/2005
JP   2005-302501   10/2005
(Continued)

OTHER PUBLICATIONS

JPO Office Action issued Aug. 8, 2012 for Japanese Patent Application No. 2008-549417, which corresponds to the present application.

*Primary Examiner* — Jonathan Crepeau
*Assistant Examiner* — Jacob Buchanan
(74) *Attorney, Agent, or Firm* — McDermott Will & Emery, LLP

(57) ABSTRACT

The present invention relates to a cooling structure of a lithium ion secondary battery system. The cooling structure of a lithium ion secondary battery system according to the present invention provides cooling channels for lithium battery unit cells accommodated by a laterally partitioned arrangement of main frames, each having a heat radiation part and lattice-shaped paths, and partitioning frames, and allows air, blown by a cooling fan, to cool the lithium battery unit cells while passing through the cooling channels and the lattice-shaped paths. Each of the main frames has a pair of passage slots formed in both sides thereof to allow the air blown by the cooling fan to be directly blown to each accommodated lithium battery unit cell, thus forming each secondary cooling channel communicating with the pair of passage slots.

6 Claims, 18 Drawing Sheets

(56) References Cited

U.S. PATENT DOCUMENTS

| | | | |
|---|---|---|---|
| 5,756,227 A | 5/1998 | Suzuki | |
| 5,904,999 A | 5/1999 | Kimberg et al. | |
| 6,127,061 A * | 10/2000 | Shun et al. | 429/406 |
| 6,255,015 B1 | 7/2001 | Corrigan et al. | |
| 6,437,537 B2 | 8/2002 | Park et al. | |
| 2004/0021442 A1* | 2/2004 | Higashino | 320/112 |
| 2004/0142238 A1* | 7/2004 | Asahina et al. | 429/176 |
| 2005/0208375 A1* | 9/2005 | Sakurai | 429/162 |
| 2005/0285567 A1 | 12/2005 | Kim | |
| 2005/0287426 A1* | 12/2005 | Kim et al. | 429/149 |
| 2006/0042683 A1* | 3/2006 | Gangemi | 136/252 |
| 2006/0115719 A1* | 6/2006 | Jeon et al. | 429/156 |
| 2006/0234119 A1* | 10/2006 | Kruger et al. | 429/160 |
| 2007/0037051 A1* | 2/2007 | Kim et al. | 429/151 |
| 2007/0072066 A1* | 3/2007 | Yoon et al. | 429/99 |
| 2007/0081356 A1* | 4/2007 | Lee et al. | 362/561 |

FOREIGN PATENT DOCUMENTS

| | | | | |
|---|---|---|---|---|
| JP | 2006-260967 | 9/2006 | | |
| WO | WO 2006068366 A1 * | 6/2006 | | H01M 2/10 |
| WO | WO-2006/101342 A1 | 9/2006 | | |

* cited by examiner

COOLING CHANNEL

COOLING CHANNEL

COOLING CHANNEL

SECONDARY COOLING CHANNEL (TYPICAL TYPE)

SECONDARY COOLING CHANNEL (X-TYPE)

SECONDARY COOLING CHANNEL (D-TYPE)

COOLING STRUCTURE OF LITHIUM ION SECONDARY BATTERY SYSTEM

CROSS REFERENCE TO PRIOR APPLICATIONS

This application is the U.S. national phase of International Application No. PCT/KR2007/000030, filed Jan. 3, 2007, which claims priority to Korean Application No. 10-2006-0001357, filed Jan. 5, 2006 and Korean Application No. 10-2007-0000208, filed Jan. 2, 2007. The disclosure of each application is incorporated herein by reference in its entirety. The International Application published in English on Jul. 12, 2007 as WO 2007/078147 under PCT Article 21(2).

TECHNICAL FIELD

The present invention relates, in general, to a cooling structure of a lithium ion secondary battery system and, more particularly, to a cooling structure of a lithium ion secondary battery system, in which open structures (passage slots) are formed in the sides of a main frame so that air blown by a cooling fan can be directly applied to a lithium battery unit cell as well as to the cooling channel of a heat radiation part formed by combining the main frame with a partitioning frame, thus maximizing heat radiation efficiency.

BACKGROUND ART

Generally, research on secondary batteries that can be discharged and recharged, unlike primary batteries, has been actively carried out along with the development of advanced technologies, such as digital cameras, cellular phones, notebook computers, or hybrid vehicles. Secondary batteries may include a nickel-cadmium battery, a nickel-metal hydride battery, a nickel-hydrogen battery, a lithium ion secondary battery, etc. Of these batteries, the lithium ion secondary battery has an operating voltage of 3.6V or more, and is used for power for portable electronic devices, or is used for a high power hybrid vehicle in such a way that several batteries or several tens of batteries are connected in series with each other. Since such a lithium ion secondary battery has an operating voltage that is three times as high as that of the nickel-cadmium battery or nickel-metal hydride battery, and has excellent characteristics of energy density per unit weight, the popularity of the lithium ion secondary battery has rapidly increased.

A lithium ion secondary battery can be manufactured in various shapes. Representative shapes thereof include a cylinder type and a prismatic type, which are mainly used for lithium ion batteries. A lithium polymer battery that has recently been popularized is manufactured as a flexible pouch-type battery, so that the shape thereof can be relatively freely implemented. Further, since a lithium polymer battery is very safe and is also lightweight, such a lithium polymer battery is considered suitable for the realization of portable electronic devices having slim and lightweight structures.

Referring to FIG. 1, a conventional pouch-type lithium ion secondary battery 10 includes a battery part 11, and a casing 12 for providing an inner space 12a in which the battery part 11 is accommodated.

The battery part 11 has a shape in which a positive electrode plate 11a, a separator 11c, and a negative electrode plate 11b are stacked together. Respective plates of the battery part 11 are electrically connected to positive and negative electrode tabs 13 and 14.

First ends of the positive and negative electrode plates 11a and 11b protrude outward from the casing 12 through the sealing portions 12b of the casing 12. The protruding ends of the positive and negative electrode tabs 13 and 14 are connected to the terminals of a protection circuit board (not shown).

Pieces of sealing tape 15 are respectively wound around the external surfaces of the positive and negative electrode tabs 13 and 14 so that an electrical short circuit between the casing 12 and the electrode tabs 13 and 14 can be prevented at portions that come into contact with the sealing portions 12b.

Such a casing 12 is a pouch-type casing that includes a middle layer made of a metallic foil, and inner and outer surface layers which are attached to both sides of the metallic foil and are made of insulating films, unlike the structure of a cylinder type or prismatic type can, which is molded using a thick metallic film. The pouch-type casing can be freely bent thanks to the excellent molding characteristics thereof. In such a pouch-type casing 12, the inner space 12a capable of accommodating the battery part 11 is formed, as described above, and the sealing portions 12b provided to the thermal adhesion surface are formed along the border of the inner space 12a.

FIG. 2 is an enlarged view taken along line II-II of FIG. 1.

The casing 12 is a composite film composed of a middle layer, which is made of metallic foil, for example, aluminum foil, and inner and outer surface layers which are attached to the inner and outer sides of the middle layer and are made of insulating films in order to protect the middle layer.

In the inner space 12a formed in the casing 12, the battery part 11, in which the positive electrode plate 11a, the separator 11c, and the negative electrode plate 11b are sequentially arranged, is accommodated. The positive electrode tab 13 and the negative electrode tab 14 are drawn from the positive electrode plate 11a and the negative electrode plate 11b, respectively, as shown in FIG. 1. The ends of the drawn electrode tabs 13 and 14 are exposed to the outside through the sealing portions 12b of the casing 12. In the sealing portions 12b, the outer surfaces of the electrode tabs 13 and 14 are covered with sealing tape 15.

The pouch-type lithium ion secondary battery 10 having the above structure is constructed so that the battery part 11 is completed by electrically connecting the positive and negative electrode tabs 13 and 14 to the positive and negative electrode plates 11a and 11b, respectively, and by winding the positive electrode plate 11a, the separator 11c, and the negative electrode plate 11b in any one direction after sequentially arranging them.

The completed battery part 11 is mounted in the casing 12, having the inner space 12a therein, through a drawing process, and the first ends of respective electrode tabs 13 and 14 are exposed to the outside of the casing 12 when the battery part 11 is mounted. In this state, predetermined heat and pressure are applied to the sealing portions 12b of the casing 12 to conduct thermal adhesion, and thus the pouch-type lithium ion secondary battery 10 is completed.

In order to stabilize the structure of the pouch-type lithium ion secondary battery 10, the presence of abnormalities in the battery is determined through a series of formation processes, such as charging, aging, and discharging.

Meanwhile, when a high power lithium battery is required, as in the case of a hybrid vehicle, several tens to several hundreds of pouches having the same structure as the pouch of FIGS. 1 and 2 are stacked together and are connected in series with each other, so that a high voltage can be obtained.

Since such a pouch-type lithium polymer battery is implemented using a weak aluminum pouch that can be easily bent or curved, it can be used for a long period of time only when the aluminum pouch is protected using a robust casing unit. In consideration of the fact, the present applicant proposed a preferred embodiment in Korean Patent Appln. No. 2005-24172.

The technical details of the above patent are described below. As shown in FIG. 3, a unit cell 31 is constructed to include a pouch 34 having a lithium ion secondary battery therein, and a pair of positive electrode tab 32 and negative electrode tab 33 formed on any one surface of the pouch 34 in the shape of a shelf so that the ends of respective electrode tabs 32 and 33 are bent in opposite directions.

As shown in FIGS. 4 and 5, the lithium battery unit cell 31 having such electrode tabs 32 and 33 includes separate frame members to maintain the states of the parallel and vertically standing electrode tabs, to decrease the temperature of each lithium battery unit cell 31, which radiates heat, and to realize smooth heat radiation. Such frame members include a main frame 41 having lattice-shaped paths 41b in the inner space capable of accommodating the lithium battery unit cell 31, and a partitioning frame 42 functioning as a partition wall between respective main frames 41 and having lattice-shaped paths 42b corresponding to the lattice-shaped paths 41b, and have a partitioned structure in which the frames are laterally and alternately arranged in parallel with each other.

Further, a heat radiation part 41a having a thin film shape which is much smaller than the width of the inner space for accommodating the lithium battery unit cell 31 is formed on the upper portion of the main frame 41. Each cooling channel 43 having a structure allowing air to be blown is formed to correspond to the radiation part 41a of the main frame 41, implemented through the stacked combination (partitioned arrangement) of the main frame 41 with the partitioning frame 42.

FIGS. 6 and 7 are views showing the structure in which a cover 51 encloses the stacked combination structure of the main frame 41 and the partitioning frame 42, and in which a cooling fan 52 is installed offset from the center of a inlet 53, and air blown by the cooling fan 52 cools the accommodated lithium battery unit cell 31 while passing through the lattice-shaped paths 41b and 42b via the heat radiation part 41a of the main frame 41 and the partitioning frame 42, that is, the cooling channel 43, within the space partitioned by the cover 51, and is then exhausted through an outlet 54 formed on the rear part of the cover 51.

However, since air blown by the cooling fan passes by the lattice-shaped paths through the cooling channel formed between the upper portions of the main frame and the partitioning frame, the line of flow of the blown air is long, and thus the heat radiation efficiency of the lithium battery unit cell is not actually high.

DISCLOSURE

Technical Problem

Accordingly, the present invention has been made keeping in mind the above problems occurring in the prior art, and an object of the present invention is to provide a cooling structure of a lithium ion secondary battery system, in which open structures such as passage slots are formed in the sides of a main frame so that air blown by a cooling fan can be directly applied to a lithium battery unit cell as well as to the cooling channel of a heat radiation part formed by combining the main frame with a partitioning frame, thus maximizing heat radiation efficiency.

Another object of the present invention is to provide a cooling structure of a lithium ion secondary battery system, which limits the shape of the open structures formed in the sides of the frame to a tapered shape in order to further increase heat radiation efficiency.

Technical Solution

In order to accomplish the above objects, the present invention provides a cooling structure of a lithium ion secondary battery system, the cooling structure providing cooling channels for lithium battery unit cells accommodated by a laterally partitioned arrangement of main frames, each having a heat radiation part and lattice-shaped paths, and partitioning frames, and allowing air, blown by a cooling fan, to cool the lithium battery unit cells while passing through the cooling channels and the lattice-shaped paths, wherein each of the main frames has a pair of passage slots formed in both sides thereof to allow the air blown by the cooling fan to be directly blown to each accommodated lithium battery unit cell, thus forming each secondary cooling channel communicating with the pair of passage slots.

Preferably, the passage slots may be formed in first portions of the sides of the main frame on the basis of center lines of the sides thereof. In this case, two or more passage slots may be formed at regular intervals or in a zigzag pattern.

Preferably, the passage slots may be formed in center lines of the sides of the main frame. In addition, the passage slots may have tapered sections which are gradually narrowed toward a center of the secondary cooling channel along a longitudinal direction of the second cooling channel.

Preferably, the passage slots may have tapered sections which are symmetrical or asymmetrical along the longitudinal direction of the secondary cooling channel.

Advantageous Effects

Accordingly, the present invention is advantageous in that a pair of passage slots is formed in the sides of a main frame, so that the ventilating power of a cooling fan is directly applied to a lithium battery unit cell along the shortest path, thus remarkably improving cooling efficiency compared to a conventional cooling structure having no passage slots, and consequently improving the stability of the battery. Further, the present invention is advantageous in that the section of the passage slots is limited to a tapered shape, thus further improving cooling efficiency.

Figure 1:
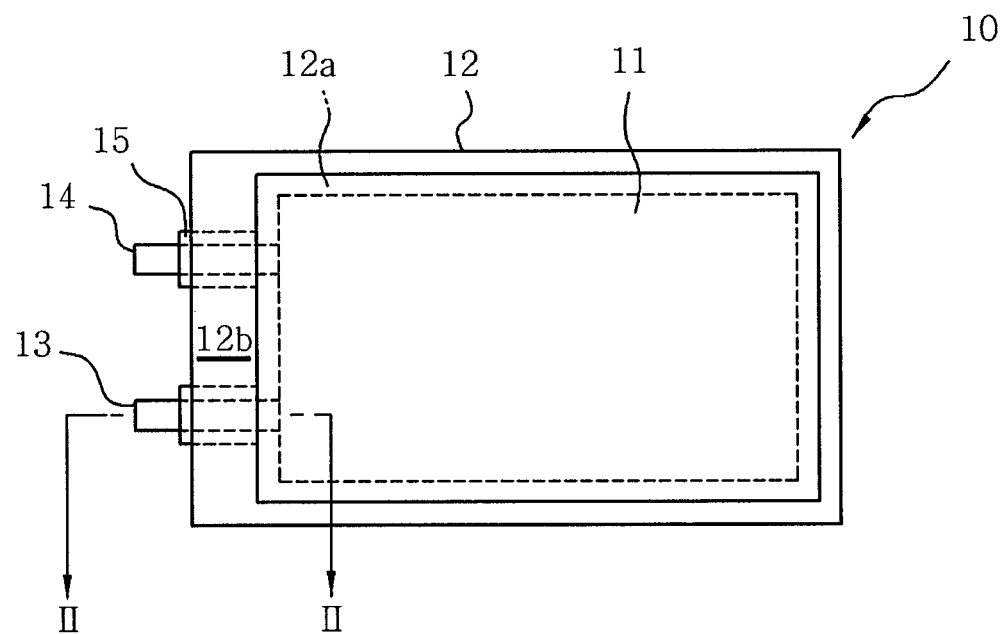
FIG. 1 is a plan view showing the structure of a conventional pouch-type lithium ion secondary battery.
Figure 2:
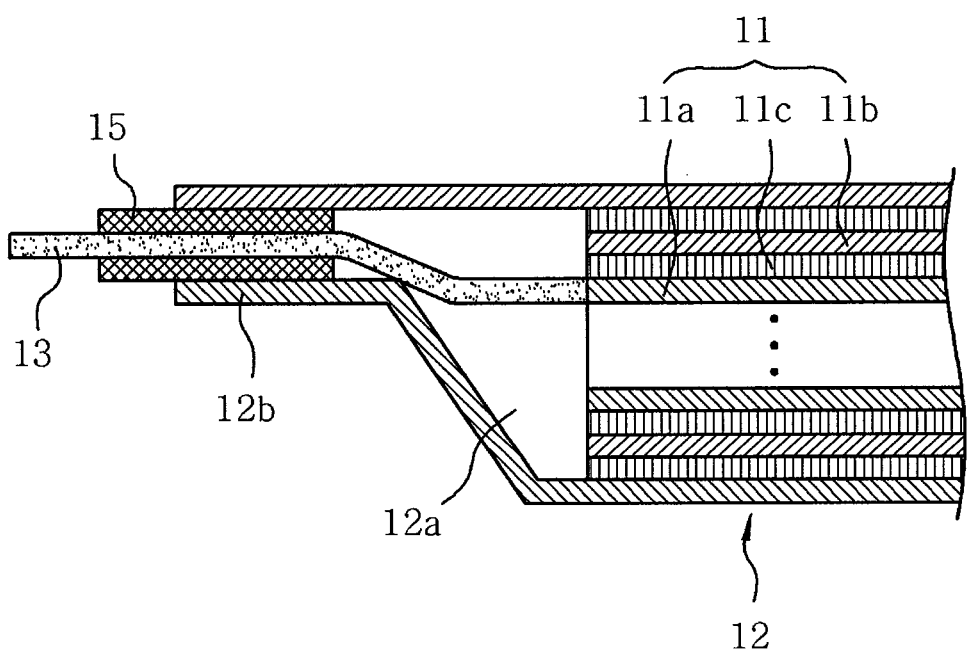
FIG. 2 is an enlarged sectional view of the pouch-type lithium ion secondary battery taken along line II-II of FIG. 1.
Figure 3:
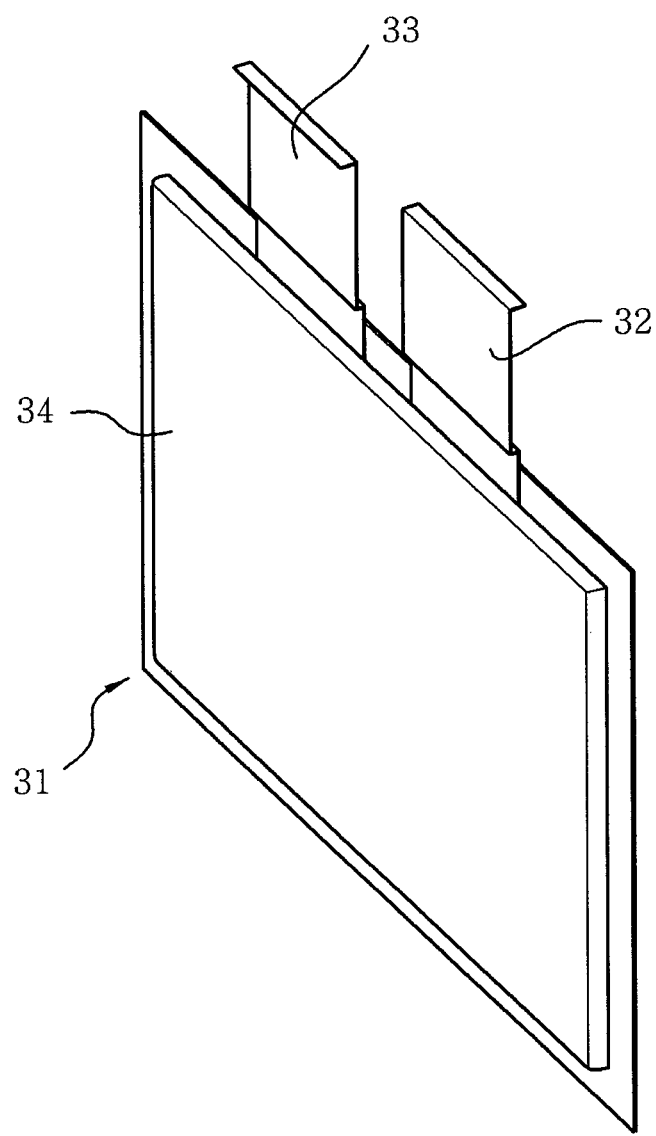
FIG. 3 is a perspective view showing another example of a conventional lithium battery unit cell.

\*\*\*Description of reference characters of important parts \*\*\*

| | | | |
|---|---|---|---|
| 31: | lithium battery unit cell | 41: | main frame |
| 41a: | heat radiation part | 41b, 42b: | lattice-shaped path |
| 41c, 41d: | passage slot | 42: | partitioning frame |
| 43: | cooling channel | 44: | secondary cooling channel |
| 44a, 44b, 44c: | secondary cooling channel | 51: | cover |
| | | 53: | inlet |
| 50: | lithium ion secondary battery system | | |
| 52: | cooling fan | | |
| 54: | outlet | | |
| S41, S41': | section of passage slot | | |

BEST MODE

Reference should now be made to the drawings, in which the same reference numerals are used throughout the different drawings to designate the same or similar components.

FIRST EMBODIMENT

Figure 8:
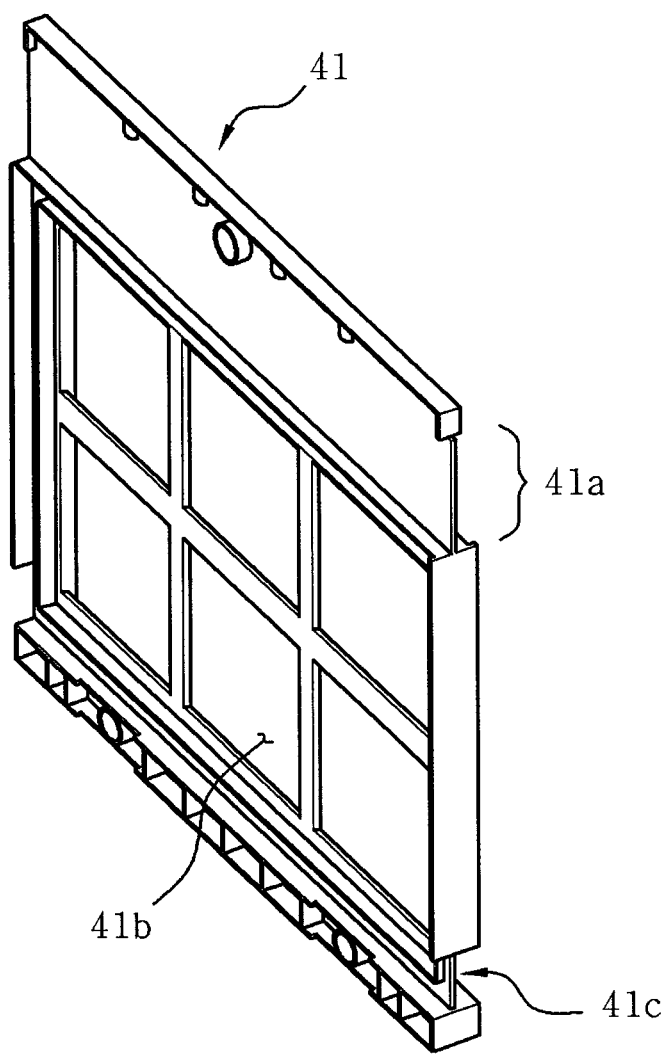
FIG. 8 is a perspective view showing the cooling structure of a frame for a lithium ion secondary battery according to an embodiment of the present invention.

FIG. 8 is a perspective view showing the cooling structure of a main frame for a lithium ion secondary battery system according to an embodiment of the present invention.

Figure 6:
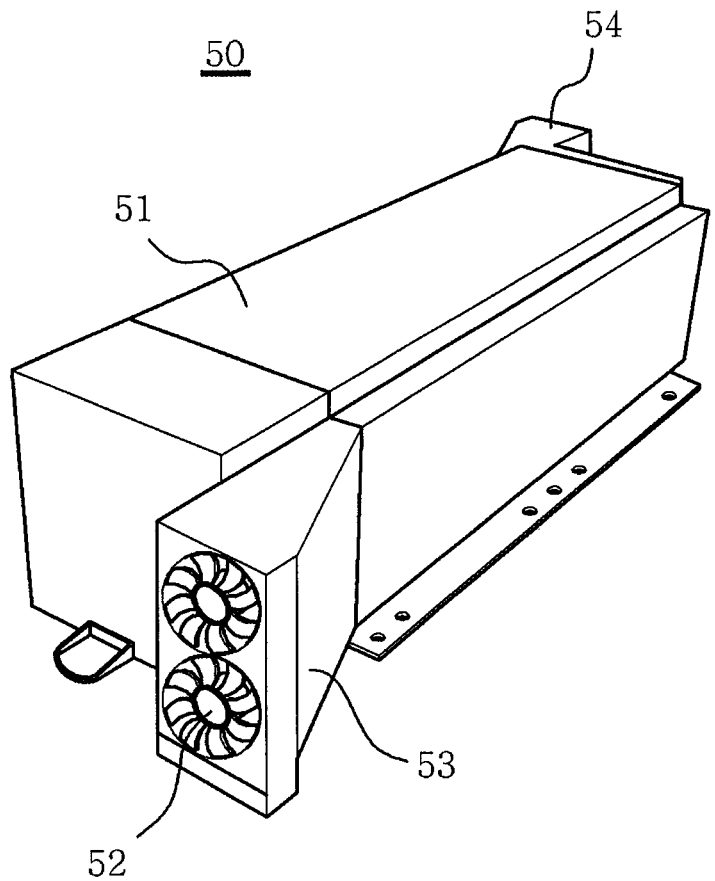
FIG. 6 is a perspective view showing the state in which a cover encloses the lithium battery frame members in the partitioned arrangement of FIG. 5.
Figure 7:
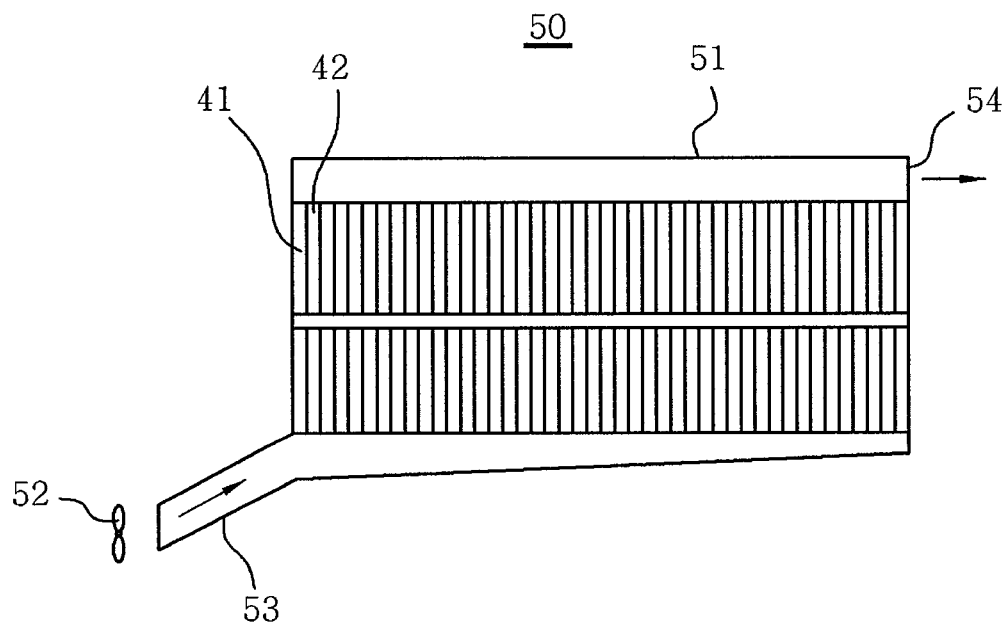
FIG. 7 is a transverse sectional view of FIG. 6.

The core object of the present invention is to propose a method of more rapidly and efficiently cooling a lithium battery unit cell 31 accommodated in a main frame 41 and a partitioning frame 42. In consideration of the fact that the ventilation orientation of a cooling fan 52 is toward the direction of the sides of the main frame 41 and the partitioning frame 42, which form the laterally partitioned arrangement in a cooling cover 51 in FIG. 6, passage slots 41c for allowing air, blown by the cooling fan 51, to be directly blown to the accommodated lithium battery unit cell 31 are formed in the first portions of the sides of the main frame 41 on the basis of center lines in a vertical direction.

Figure 9:
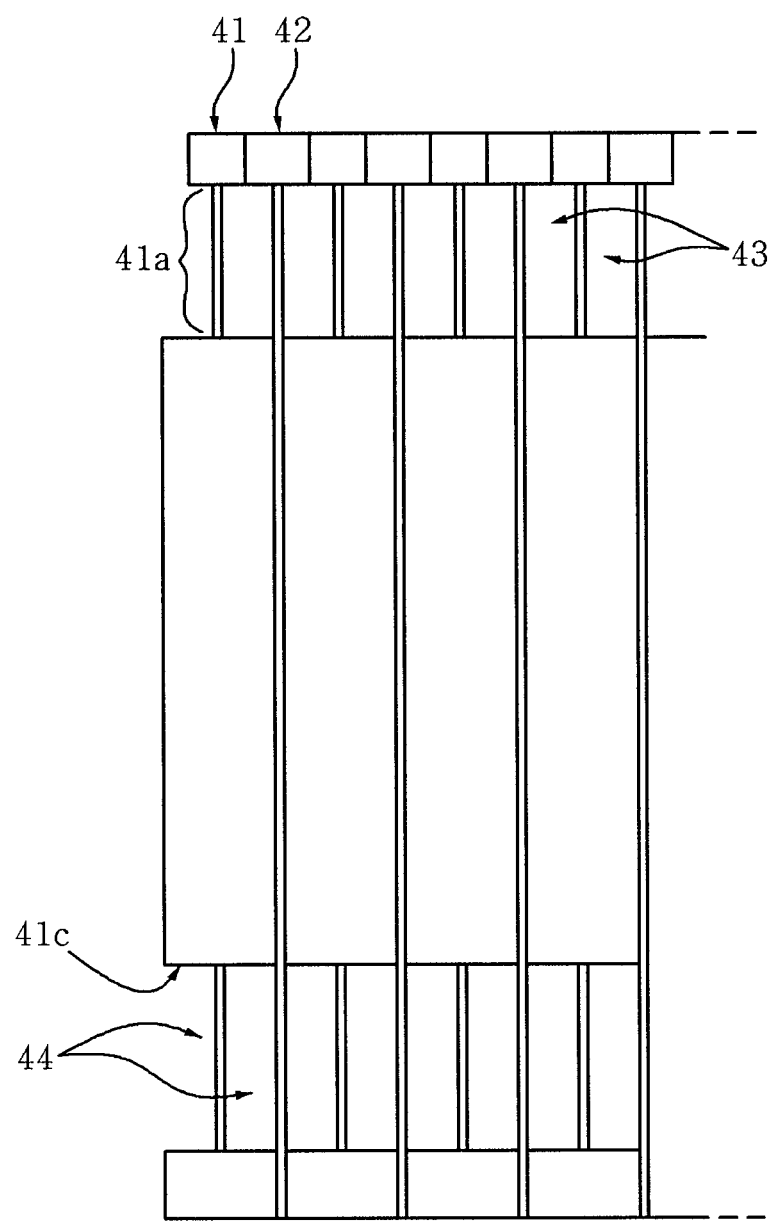
FIG. 9 is a side view showing an embodiment of the state in which the present invention is applied.

The main frames 41, each having such passage slots 41c, may constitute secondary cooling channels 44 independent of cooling channels 43 formed on the upper portions of the frames when the main frames 41 and the partitioning frames 42 are arranged in a laterally partitioned arrangement manner, as shown in FIG. 9.

Figure 10:
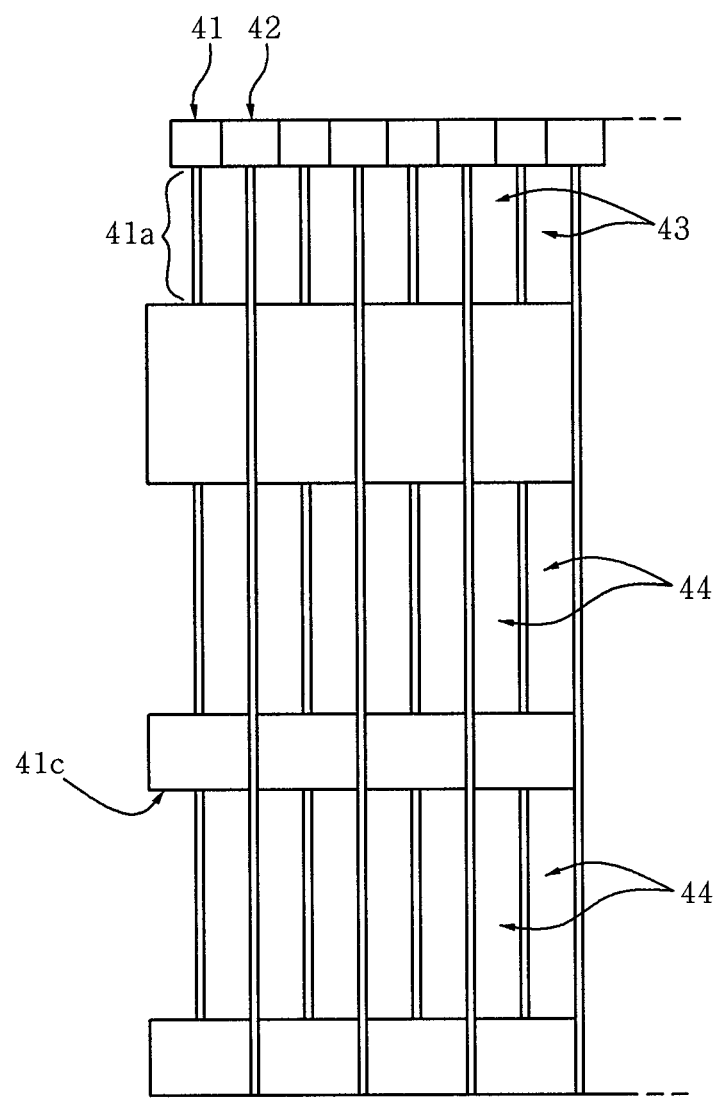
FIG. 10 is a side view showing another embodiment of the state in which the present invention is applied.

Further, the passage slots 41c of the present invention can be formed in such a way that two or more passage slots 41c are symmetrically formed at regular intervals in each side of the main frame 41, as shown in FIG. 10.

Figure 11:
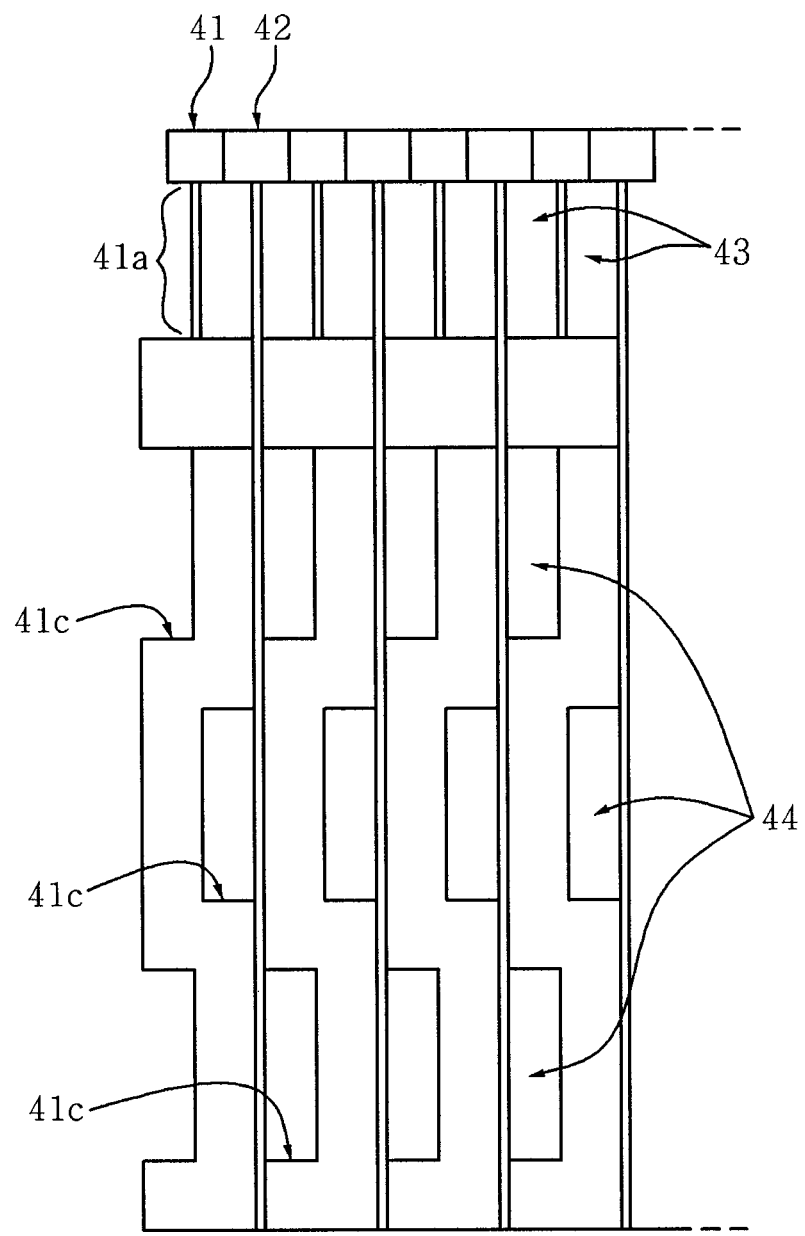
FIG. 11 is a side view showing a further embodiment of the state in which the present invention is applied.

Further, the passage slot 41c of the present invention can be formed in such a way that a plurality of passage slots 41c is formed in a zigzag pattern in each side of the main frame 41 while maintaining predetermined intervals, as shown in FIG. 11.

Meanwhile, the above-described passage slots 41c of the present invention must be formed to be paired in both sides of the main frame.

Figure 12:
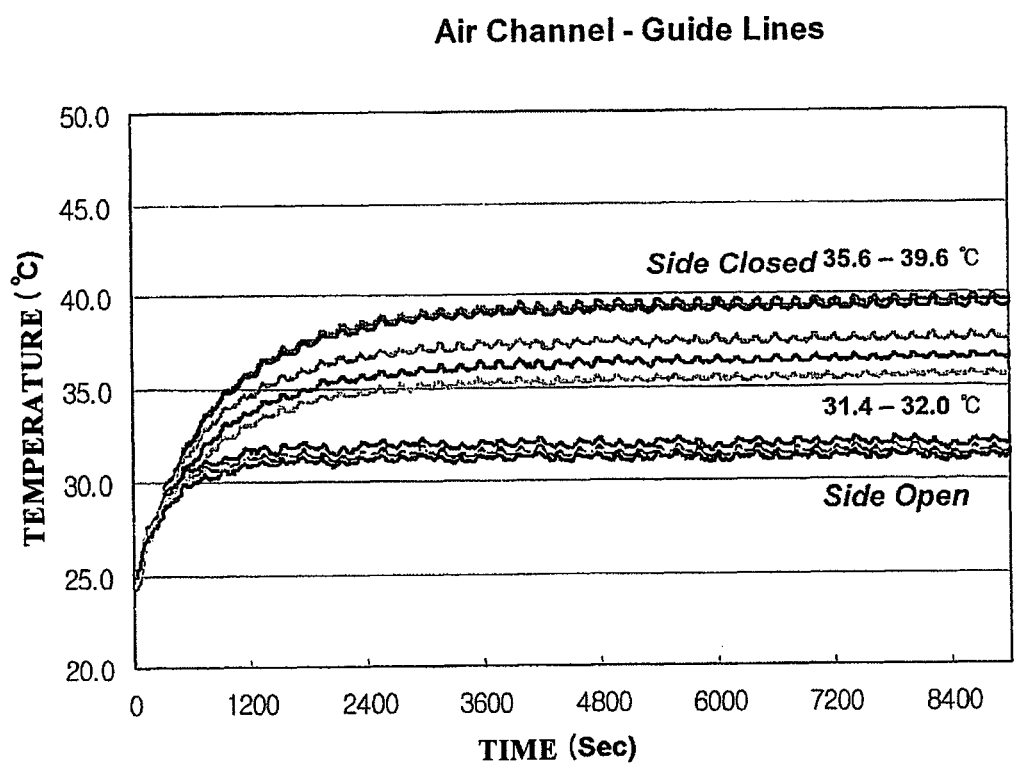
FIG. 12 is a graph showing the comparison of the cooling efficiency of the prior art and the present invention, as determined through experiments.

FIG. 12 is a graph showing the comparison of the cooling efficiency of the prior art and the present invention having passage slots, as determined through experiments.

Referring to FIG. 12, it can be seen that the cooling efficiency of the present invention is excellent. That is, conventional side-closed comparative groups having no passage slots range in temperature from 35.6 to 39.6° C. over time, whereas the present invention having passage slots range in temperature from 31.4 to 32.0° C. over time under the same conditions. Accordingly, it can be seen that the cooling efficiency of the present invention is superior to that of the prior art.

SECOND EMBODIMENT

Figure 13:
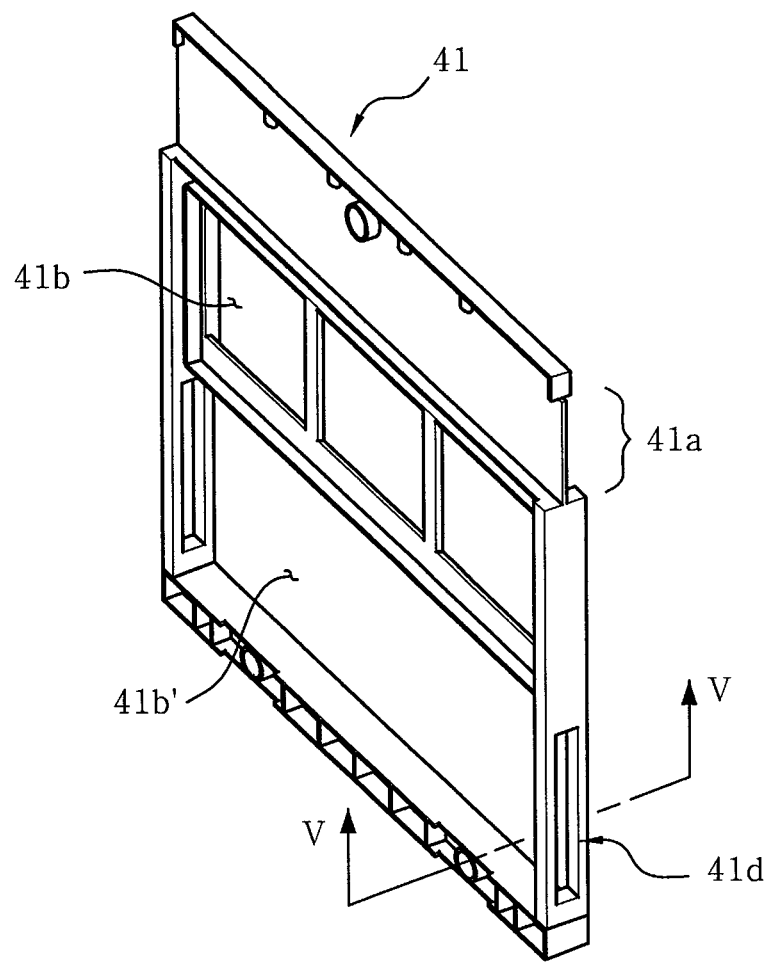
FIG. 13 is a perspective view showing the cooling structure of a frame for a lithium ion secondary battery according to another embodiment of the present invention.
Figure 14:
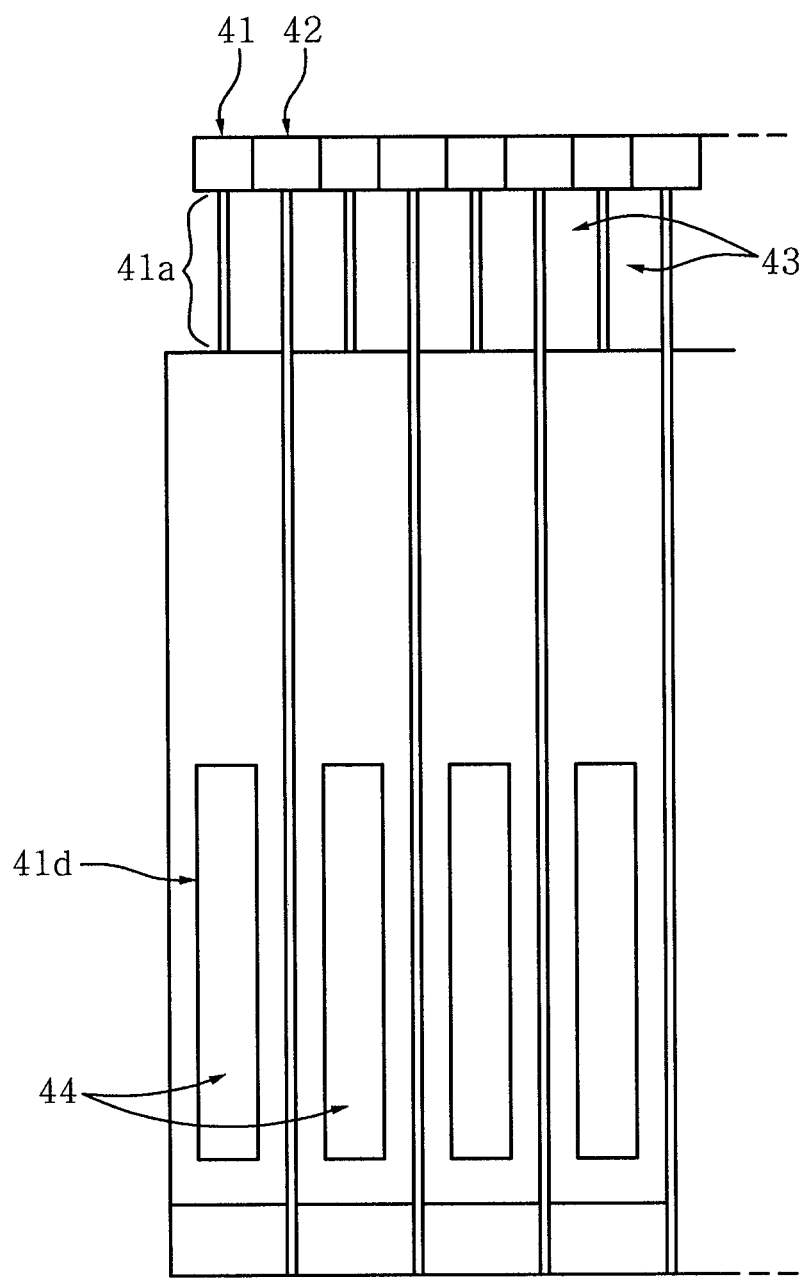
FIG. 14 is a side view showing an embodiment to which the main frame of FIG. 13 is applied.

FIG. 13 is a perspective view showing the cooling structure of a frame for a lithium ion secondary battery according to another embodiment of the present invention, and FIG. 14 is a side view showing an embodiment to which the main frame of FIG. 13 is applied.

The main frame 41 of FIGS. 13 and 14 has a structure substantially identical to that of the main frame (refer to the first embodiment) of FIG. 8 except that a pair of passage slots 41d is formed in the center lines of the sides of the main frame 41, and the partitioning frame of FIGS. 13 and 14 is identical to that of the first embodiment, and thus a detailed description of the parts other than the passage slots 41d is omitted.

This embodiment is characterized in that a pair of passage slots 41d is formed in the center lines of both sides of the main frame 41. That is, unlike the case of the first embodiment, in which the secondary cooling channel is formed between the main frame 41 and the partitioning frame 42 through the partitioned arrangement thereof, the second embodiment is constructed so that passage slots 41d are formed in the center of the main frame 41, so that secondary cooling channels 44 can be formed independent of the partitioning frame.

Further, the lattice-shaped path of the main frame can be formed to correspond to the pair of passage slots 41d. That is, a relatively large lattice-shaped path 41b' is formed between the passage slots 41d formed in both sides of the main frame 41, so that the secondary cooling channel 44 can be effectively formed.

For reference, the second embodiment shows an example in which a pair of passage slots 41d, constituting the secondary cooling channel 44, is formed on the lower portions of both sides of the main frame to have a predetermined size, with respect to the location and the size of the pair of passage slots, but it should be noted that the second embodiment is only an example, and the present invention is not limited to this example. That is, unlike the second embodiment, a plurality of pairs of passage slots may be formed in both sides of the main frame. Further, the passage slots may be formed to be larger or smaller than the passage slots of the second embodiment. Consequently, it should be noted that the location and shape of the passage slots according to the present invention are not limited to those of FIGS. 13 and 14.

Figure 15:
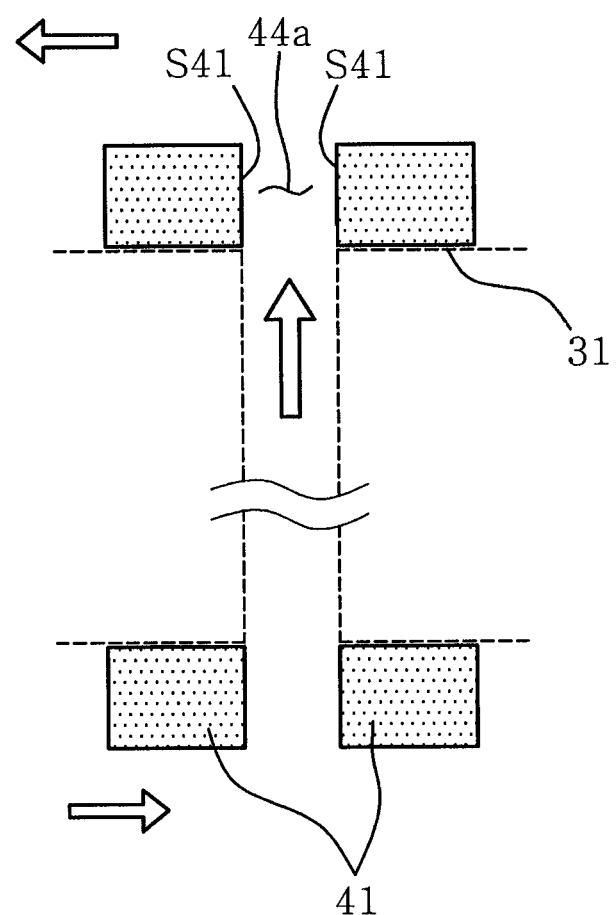
FIGS. 15 to 17 are sectional views schematically showing the section of a passage slot taken along line V-V of FIG. 13.
Figure 16:
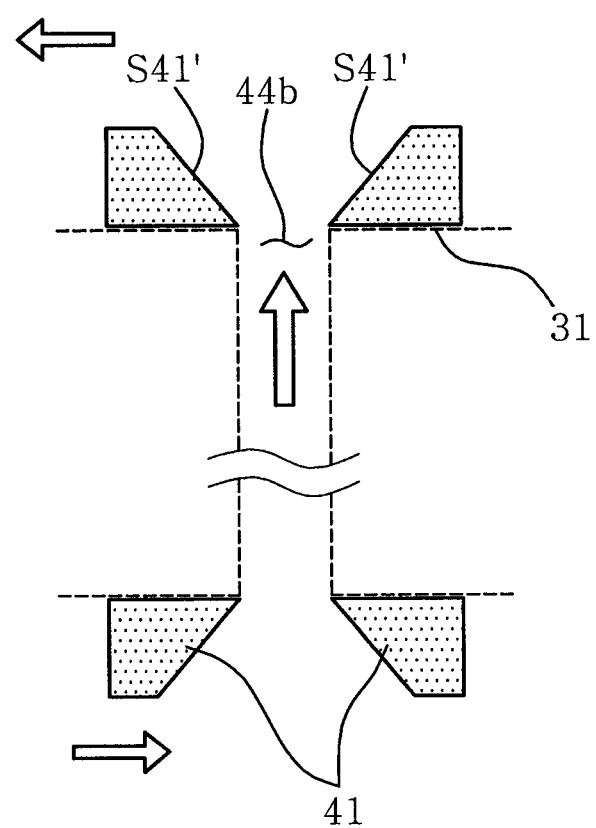
Figure 17:
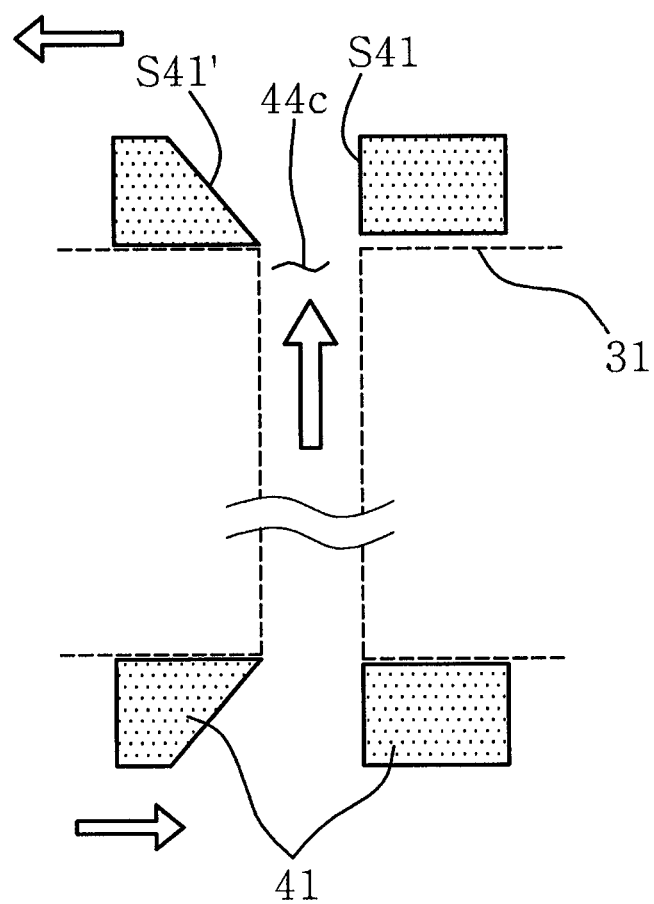

Next, FIGS. 15 to 17 illustrate the horizontal sections of a pair of passage slots formed in both sides of a main frame 41, and secondary cooling channels 44a, 44b, and 44c for communicating with the passage slots according to the present invention.

Figure 4:
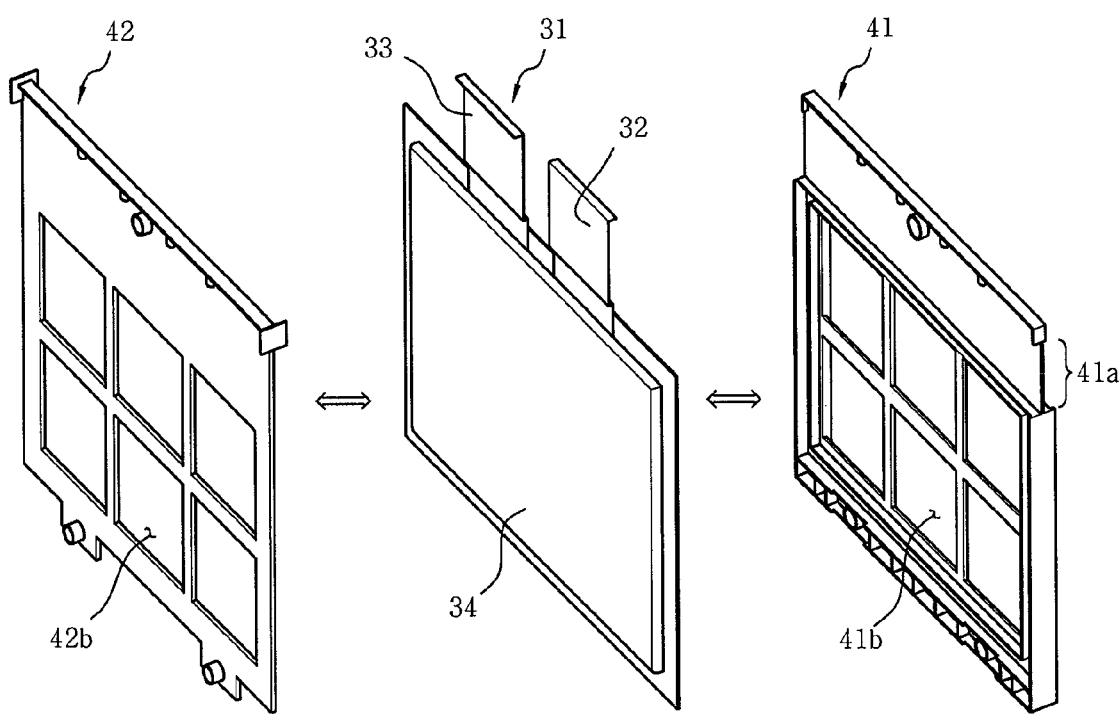
FIG. 4 is an exploded perspective view showing the laterally partitioned arrangement of the frame members for supporting the lithium battery unit cell of FIG. 3.
Figure 5:
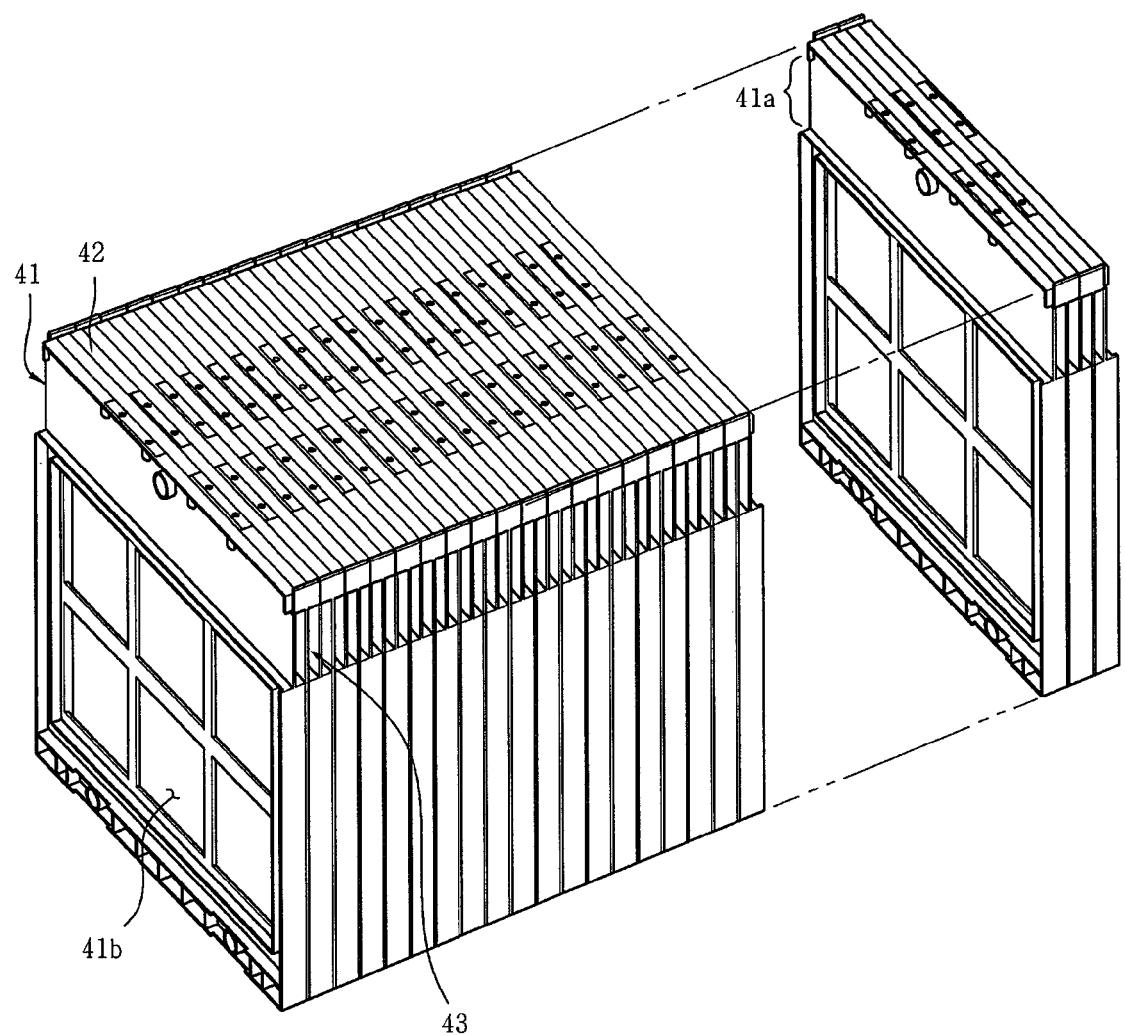
FIG. 5 is a perspective view showing the arrangement of the frame members for lithium battery unit cells in FIG. 4.

For example, each of the secondary cooling channels 44a, 44b, and 44c is implemented using a pair of passage slots 41d and the space between the passage slots (for example, a lattice-shaped path 41b). In this case, both surfaces of the space are occupied by the pouches (34 of FIG. 4) of the lithium battery unit cells disposed at both surfaces of the main frame, and thus each of the secondary cooling channels 44a, 44b, and 44c is formed.

Figure 18:
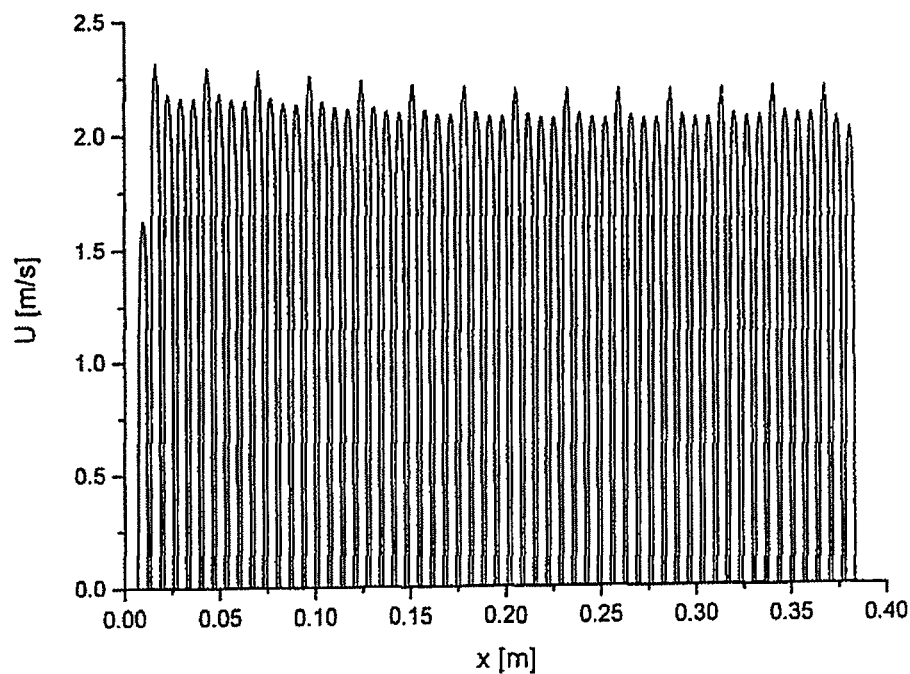
FIGS. 18 to 20 are graphs showing the comparison of the cooling efficiency of cooling channels corresponding to the sections of the passage slots of FIGS. 15 to 17, as determined through experiments.
Figure 19:
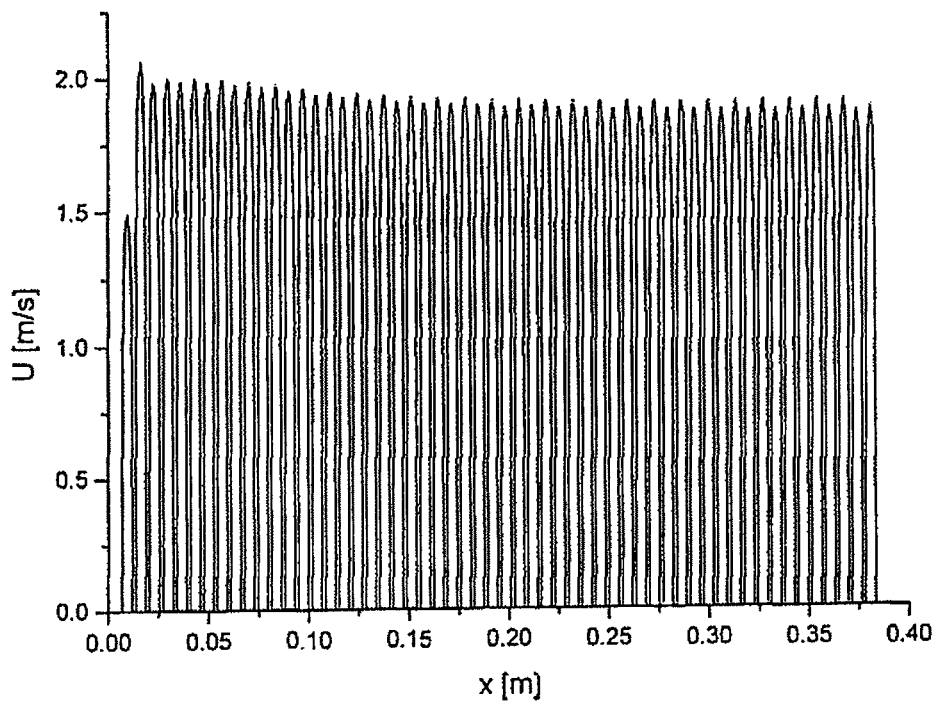
Figure 20:
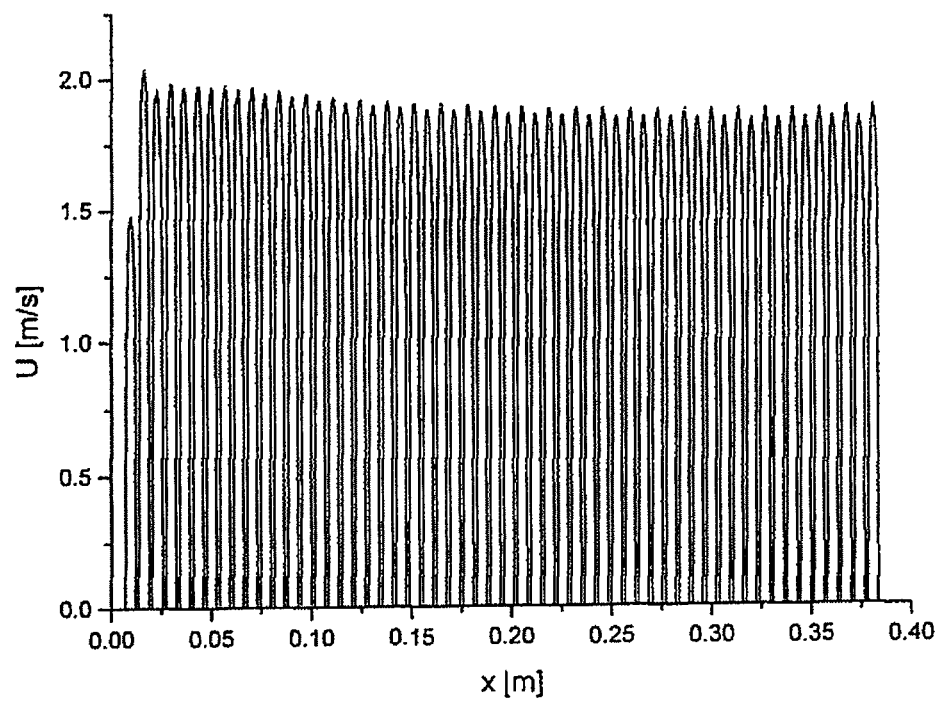
Figure 21:
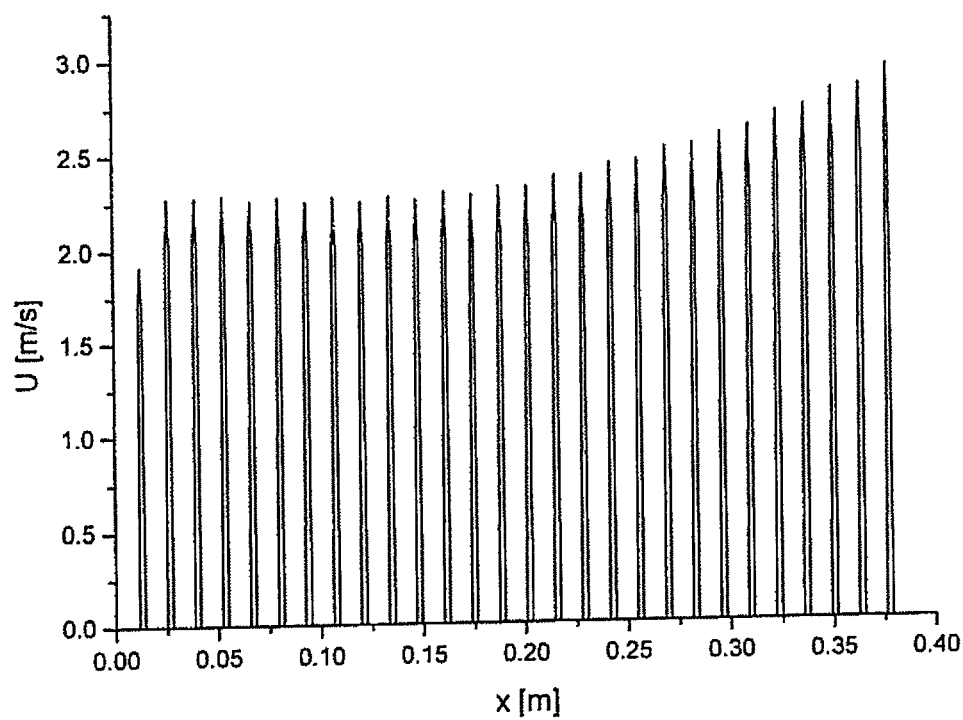
FIGS. 21 to 23 are graphs showing the comparison of the cooling efficiency of secondary cooling channels corresponding to the sections of the passage slots of FIGS. 15 to 17, as determined through experiments.
Figure 22:
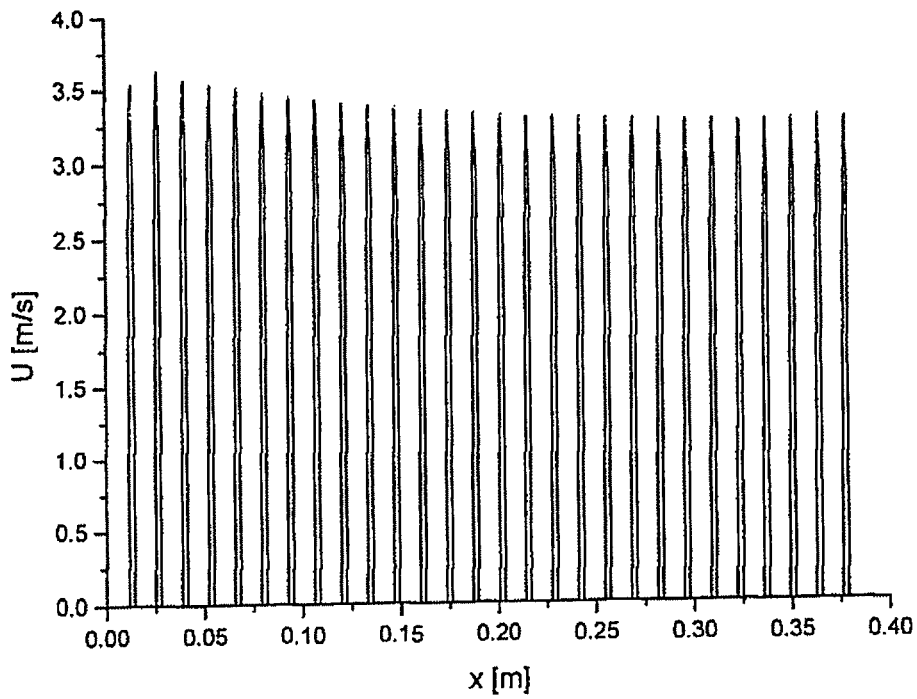
Figure 23:
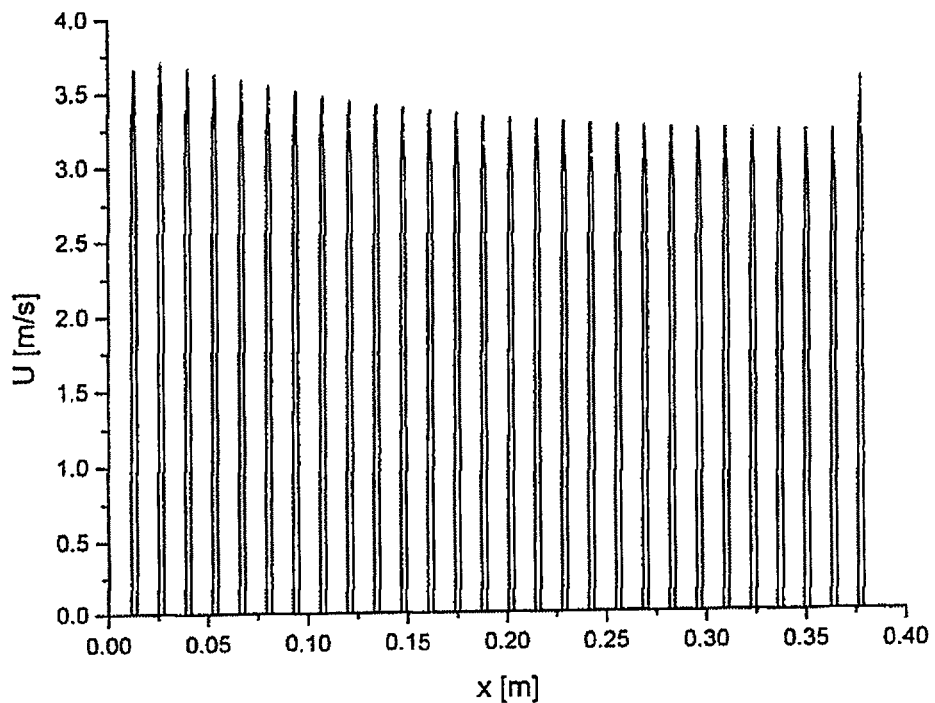

Further, FIGS. 18 to 20 are graphs showing the results of the simulation of the amount of air blown for respective channels through the cooling channels 43 (or main channels) when the secondary cooling channels 44a, 44b, and 44c having the sections of FIGS. 15 to 17, respectively, are provided, and FIGS. 21 to 23 are graphs showing the results of the simulation of the amount of air blown for respective channels through the secondary cooling channels 44 (or side channels) when the secondary cooling channels 44a, 44b, and 44c having the sections of FIGS. 15 to 17, respectively, are provided.

For reference, it should be noted that such simulations were conducted on the basis of the case where a total of 56 battery cells are stacked together, and the results of the simulation were obtained on the basis of 56 cooling channels (main channels), and 28 secondary cooling channels (side channels).

With reference to the above drawings, the shape of the section of secondary cooling channels capable of realizing more efficient and uniform cooling with respect to a plurality of cooling channels (including the secondary cooling channels) formed by partitioned arrangement is described below.

FIG. 15 illustrates the typical shape in which passage slots formed in both sides of the main frame 41 have two sections S41 which are parallel with each other. A secondary cooling channel 44a having such a shape is designated as a 'typical type' in the following description. FIG. 16 illustrates the shape in which passage slots formed in both sides of the main frame 41 have inclined sections S41', which are gradually narrowed toward the center of the secondary cooling channel 44b (tapered shape). A secondary cooling channel 44b having such a shape is designated as an 'X type' in the following description. FIG. 17 illustrates the shape in which passage slots formed in both sides of the main frame 41 have both sections S41 that are parallel with the longitudinal direction of the cooling channels and inclined sections S41' that are gradually narrowed toward the center of the cooling channels. A secondary cooling channel 44c having such a shape is designated as a 'D type' in the following description. For reference, in the D-type cooling channel, the inclined sections S41' of the sections S41 and S41' of the passage slots precede the sections S41 on the basis of the direction in which air is supplied.

Both the X-type cooling channel 44b and the D-type cooling channel 44c are similar to each other in that they have tapered sections, but the D-type cooling channel 44c can exhibit the difference with respect to the X-type cooling channel 44b in that it basically has directionality (for the direction of the supply of air).

Further, the results of experiments on the pressure drop for a lithium ion secondary battery system having no secondary cooling channel and lithium ion secondary battery systems having secondary cooling channels respectively based on typical type (44a of FIG. 15), X-type (44b of FIG. 16), and D-type (44c of FIG. 17) passage slots are compared to each other in the following Table 1.

TABLE 1

| System type | Passage slot type | Pressure drop |
|---|---|---|
| No passage slot | — | 59.5 |
| With passage slot | Typical | 47.6 |
|  | X-type | 45.7 |
|  | D-type | 45.1 |

As shown in Table 1, it can be seen that the lowest pressure drop occurs in the case where passage slots having D-type sections are applied, and thus the secondary cooling channels are provided. However, since such passage slots having D-type sections have directionality for the direction of the supply of air (for example, when air is supplied in the opposite direction, the efficiency of pressure drop may vary), it can be seen that an actual system is more preferably constructed using the passage slots having X-type sections (refer to FIG. 16).

For reference, FIGS. 18 to 23 illustrate the results of a simulation conducted under the condition that the lithium ion secondary battery systems are designed in common such that the initial width $W_{in\_ini}$, of the inlet (53 of FIG. 6) thereof is 50 mm, the final width $W_{in\_final}$ thereof is 50 mm, the initial width $W_{out\_ini}$ of the outlet (54 of FIG. 6) is 50 mm, and the final width $W_{out\_final}$ thereof is 50 mm, and that a stacked cell structure having a total of 56 battery cells stacked together is provided, and the total flow rate of the systems is set to 1680 LPM.

Further, in the case of FIGS. 21 to 23 related to the secondary cooling channels (side channels), different results can be obtained depending on the shapes of the sections of the secondary cooling channels. This shows that the effects thereof can vary depending on the shapes of the sections of the secondary cooling channels. Meanwhile, in the case of FIGS. 18 to 20, related to cooling channels (main channels), although the cooling channels 43 have the same sections, different results can be obtained when the shapes of the secondary cooling channels 44a, 44b, and 44c formed under the cooling channels 43 are different from each other. This shows that the amount of blown air passing through the cooling channels formed over the secondary cooling channels is influenced by the shapes of the sections of the secondary cooling channels.

As described above, the present invention is characterized in that, when pouch-type lithium ion secondary batteries (lithium battery unit cells) are accommodated and stacked using frame members (for example, main frames and partitioning frames), secondary cooling channels formed in the sides of the main frames to directly guide blown air to the lithium battery unit cells (each secondary cooling channel being formed, for example, by a pair of passage slots formed in both sides of each main frame according to the properties of the present invention) are provided in addition to existing cooling channels in order to efficiently perform heat radiation on a corresponding lithium battery unit cell, and in that the sections (horizontal sections) of the passage slots at both ends of each secondary cooling channel are limited to specific shapes, for example, an X-type section, thus greatly improving the cooling efficiency thereof.

Further, those skilled in the art will appreciate that the technical spirit of the invention is limited to the above embodiments, and various modifications, additions and substitutions are possible, without departing from the scope and spirit of the invention as disclosed in the accompanying claims.

The invention claimed is:

1. A cooling structure of a lithium ion secondary battery system, comprising:
   cooling channels for lithium battery unit cells accommodated by a laterally partitioned arrangement of main frames, each having a heat radiation part and lattice-shaped paths, and partitioning frames, and allowing air, blown by a cooling fan, to cool the lithium battery unit cells while passing through the cooling channels and the lattice-shaped paths,
   wherein each of the main frames has a pair of passage slots formed in both sides thereof to allow the air blown by the cooling fan to be directly blown to each accommodated lithium battery unit cell, thus forming a secondary cooling channel communicating with the pair of passage slots,
   wherein the secondary cooling channel is formed when the main frame and the corresponding partitioning frame are arranged in a partitioned arrangement structure,
   wherein the pair of passage slots is formed in center lines of the sides of the main frame, thus forming the secondary cooling channel, and
   wherein the passage slots forming the pair have one tapered section which is gradually narrowed along a longitudinal direction of the secondary cooling channel and another section is parallel along the longitudinal direction of the secondary cooling channel.

2. The cooling structure according to claim 1, wherein the pair of passage slots is formed in first portions of the sides of the main frame on the basis of center lines of the sides thereof.

3. The cooling structure according to claim 2, wherein the pair of passage slots is formed such that a plurality of pairs of passage slots is formed at regular intervals.

4. The cooling structure according to claim 3, wherein the pairs of passage slots are arranged in a zigzag pattern.

5. The cooling structure according to claim 1, wherein the passage slots forming the pair on the main frame have tapered sections which are symmetrical along the longitudinal direction of the secondary cooling channel.

6. The cooling structure according to claim 1, wherein the passage slots forming the pair on the main frame have tapered sections which are asymmetrical along the longitudinal direction of the secondary cooling channel.

\* \* \* \* \*

UNITED STATES PATENT AND TRADEMARK OFFICE
CERTIFICATE OF CORRECTION

PATENT NO. : 8,652,675 B2
APPLICATION NO. : 12/159533
DATED : February 18, 2014
INVENTOR(S) : Jung Sik Yun et al.

Page 1 of 1

It is certified that error appears in the above-identified patent and that said Letters Patent is hereby corrected as shown below:

Title Page, Item (73) Assignee should read -- SK INNOVATION CO., LTD., Seoul (KR) --

Signed and Sealed this
Fifteenth Day of July, 2014

Michelle K. Lee
*Deputy Director of the United States Patent and Trademark Office*